United States Patent
Möckli

(10) Patent No.: US 10,207,527 B2
(45) Date of Patent: Feb. 19, 2019

(54) PROCESSING SYSTEM WITH DIGITAL PRINTING AND A POST-PROCESSING STATION

(71) Applicant: FERAG AG, Hinwil (CH)

(72) Inventor: Jürg Möckli, Wetzikon (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 15/658,679

(22) Filed: Jul. 25, 2017

(65) Prior Publication Data
US 2018/0029396 A1    Feb. 1, 2018

(30) Foreign Application Priority Data

Jul. 29, 2016   (CH) ..................................... 00998/16
Jul. 14, 2017   (WO) .................. PCT/IB2017/054266

(51) Int. Cl.
*B41J 29/38*    (2006.01)
*H04N 1/00*    (2006.01)
*B41J 2/175*    (2006.01)

(52) U.S. Cl.
CPC ............... *B41J 29/38* (2013.01); *B41J 2/175* (2013.01); *H04N 1/00167* (2013.01); *H04N 1/00639* (2013.01)

(58) Field of Classification Search
CPC .. B41J 29/38; H04N 1/00167; H04N 1/00639
USPC ............................................ 347/110; 412/13
See application file for complete search history.

(56) References Cited

U.S. PATENT DOCUMENTS

| 6,953,513 B1* | 10/2005 | Volkert ..................... B42C 3/00 |
| | | 156/256 |
| 2009/0274536 A1 | 11/2009 | Silberbauer |
| 2010/0032476 A1 | 2/2010 | Möckli |
| 2010/0051196 A1 | 3/2010 | Hunkeler et al. |
| 2010/0104400 A1* | 4/2010 | Silberbauer ........... B42C 9/0037 |
| | | 412/1 |
| 2011/0037214 A1* | 2/2011 | Graushar ................ B41F 13/56 |
| | | 270/1.02 |

(Continued)

FOREIGN PATENT DOCUMENTS

| DE | 100 08 313 A1 | 8/2001 |
| DE | 10 2005 054 440 A1 | 5/2007 |

(Continued)

*Primary Examiner* — Huan Tran
*Assistant Examiner* — Alexander D Shenderov
(74) *Attorney, Agent, or Firm* — Pauley Erickson & Kottis

(57) ABSTRACT

A processing system having at least one digital printing docking point for connecting at least one digital printing unit and at least one post-processing station, which are connected by a coupling station so that at least one input of the at least one post-processing station is connected to at least one digital printing docking point, and having a first control unit for controlling the coupling station and a second control unit for controlling the at least one post-processing station. The first control unit is supplied with information concerning the product output of the at least one digital printing unit and at least one processing attribute of the product output, and directly or indirectly transfers same to the second control unit with a dynamic data feed, and the at least one post-processing station is controlled by the second control unit with this information.

28 Claims, 6 Drawing Sheets

(56) References Cited

U.S. PATENT DOCUMENTS

2011/0049781 A1* 3/2011 Lewalski ............... B26D 7/015
                                                        270/58.07
2011/0215512 A1   9/2011  Feyerabend et al.
2015/0363676 A1  12/2015  Elchlepp et al.
2016/0105484 A1   4/2016  Haas et al.

FOREIGN PATENT DOCUMENTS

| DE | 10 2012 103 679 A1 | 10/2013 |
| DE | 10 2014 114 585 A1 | 4/2016 |
| EP | 2 179 859 A1 | 4/2010 |
| EP | 2 363 364 A1 | 9/2011 |
| WO | WO 98/03419 A1 | 1/1998 |
| WO | WO 99/54244 A1 | 10/1999 |
| WO | WO 2007/089408 A2 | 8/2007 |
| WO | WO 2008/043194 A2 | 4/2008 |

* cited by examiner

PROCESSING SYSTEM WITH DIGITAL PRINTING AND A POST-PROCESSING STATION

CROSS-REFERENCE TO RELATED APPLICATIONS

Swiss Patent Application 00986/16, filed 28 Jul. 2016, and PCT International Application PCT/IB2017/054266, filed 14 Jul. 2017, the priority documents corresponding to this invention, to which a foreign priority benefit is claimed under Title 35, United States Code, Section 119, and Title 37, United States Code, Section 1.55, and their entire teachings are incorporated, by reference, into this specification.

BACKGROUND OF THE INVENTION

Field of the Invention

The invention relates to a processing system having at least one digital printing docking point for connecting at least one digital printing unit and at least one post-processing station.

Discussion of Related Art

WO 99/54244 describes a processing system for processing piece goods, i.e., for processing essentially identical or at least similar objects that are to be processed in large numbers and in an ordered sequence, individually or in defined groups, and generally in a more or less precisely defined position and spatial location. The processing system comprises a conveying system with a closed track system that optionally includes switches, and comprises a plurality of conveying/holding means that are independently movable in a direction on the track system, and comprises devices for loading conveying/holding means with objects or groups of objects to be processed, and comprises devices for processing objects or groups of objects, and devices for unloading processed objects or groups of objects from conveying/holding means. Means for entry control and collecting lines situated upstream therefrom are associated with the devices; the entry control generates the spatial location of the conveying/holding means and of the objects that is required by the device, and the conveying/holding means and the objects are ordered into a temporal sequence that is required by the device, and the conveying/holding means are optionally accumulated on the collecting line in front of the entry control. The devices with their associated entry control means, as well as switches are organized individually or in groups in autonomous stations having controlling means inside the station.

WO 98/03419 describes a device for bringing printed products to at least two processing stations intended for processing printed products. The device has a closed main conveying line for transporting in a conveying direction the printed products, each held by a clamp, that become available, and has multiple feed lines designed as buffer lines, and a return line. A processing station is associated with each feed line. The feed lines are connected to the main conveying line by means of controlled switches, so that, viewed in the conveying direction, each of the clamps can be supplied to any given processing station.

WO 2007/089408 A2 discloses a device for producing book blocks using a digital printer. The digitally printed paper sheets are folded and combined into stacks, which form a portion of a book block or an entire book block. The assembled book block intermediate products may subsequently be further processed, in particular milled at the binding edge, bound in a binding device, for example by adhesive binding, and cropped and further processed.

US 2010/0051196 A1 discloses a similar device, in which the folded paper sheets of a stack are temporarily adhesively joined together at suitable locations in order to prevent the individual sheets of a stack from shifting prior to the actual binding. The temporary adhesive sites are preferably selected in such a way that they are eliminated during the subsequent processing of the book block.

SUMMARY OF THE INVENTION

Digital printing has changed the production of printed products, in comparison to offset printing, in such a way that complete, in particular highly customized finished print products may be produced in a digital printer. Despite this high level of flexibility, digital printing has distinct disadvantages compared to offset printing, in particular with regard to print post-processing.

One difference in comparison to offset printing is the somewhat lower capacity in digital printing. Another difference lies in the limited post-processing options, in particular with regard to the production of printed product collections in which various subproducts are added to the main printed products by introducing, gluing, inserting, etc., or processing steps subsequent to the actual printing operation, such as folding printed sheets, assembling book blocks, binding, trimming, etc.

With regard to post-processing, various devices and processes are known from the area of offset printing that provide highly efficient production of printed product collections, for example, with high capacity. These devices and processes also allow a high level of flexibility in further processing, compared to digital printing. However, only limited customization options are provided in these processes, in particular on account of offset printing.

One object of the present invention is to provide a processing system that allows synergetic utilization of the advantages of digital printing and of the processes and devices for post-processing known from offset printing and other industrial printing methods. This object is achieved by the features of independent claim 1. As a result, at least some of the functions that are not optimally integrable in digital printing can be segregated and incorporated into a suitable post-processing station, in particular such a post-processing station for offset printing, via control according to the invention. Consequently, with a processing system according to the invention the aim is not to achieve maximum functional integration by means of the digital printing unit, which is otherwise always sought in digital printing, but, rather, to transfer certain functions, as explained below, to a flexible post-processing station, which by itself would offer only very limited customization options for further processing.

A processing system according to the invention generally includes at least one digital printing docking point for connecting at least one digital printing unit and at least one post-processing station, which are connected by means of a coupling station. This takes place in such a way that at least one input of the at least one post-processing station is connected to at least one digital printing docking point. In addition, a processing system according to the invention generally has a first control unit for controlling the coupling station, and a second control unit for controlling the at least one post-processing station. Information concerning the product output of the at least one digital printing unit and at least one processing attribute of the product output are supplied to the first control unit. The first control unit directly or indirectly transfers same to the second control unit by means of a dynamic data feed. The at least one post-processing station is controlled by the second control unit by means of this information.

Within the scope of the present invention, a digital printing docking point may be understood in particular to mean an interface for connecting a digital printer or a paper web or film web, wound on a roll, that is printed in particular by digital printing, or for connecting an unwinding station for unwinding such a roll.

Within the scope of the invention, a digital printing unit may in particular also include a digital printing intermediate processing station in addition to a digital printer or a roll as described above. In such a digital printing intermediate processing station, a film and/or paper web that is directly printed by a digital printer or unwound from a roll may be cut and/or crimped and/or folded and/or stapled and/or glued and/or stacked. A paper and/or film web may thus be processed to form an actual main product or subproduct by means of the intermediate processing station. In particular, digitally printed paper webs may be cut, folded, stacked, and optionally temporarily adhesively bonded in order to provide book block intermediate products for subsequent post-processing (binding, trimming).

However, within the scope of the invention it is also provided that such an intermediate processing station may be associated with a digital printing docking point, and the intermediate processing station may be controlled by the second control unit, likewise by means of the information that is transferred from the first control unit by means of the dynamic data feed.

A dynamic data feed may also be regarded as a process-controlled data feed in which continuously changing data, not data that are previously known (such as for a static data feed) are delivered to the second control unit.

The connection of the at least one input of the at least one post-processing station to at least one digital printing docking point may be fixed or variable. This means in particular that the at least one input of the at least one post-processing station may be connected to at least one digital printing docking point via a conveying system with fixed or variable conveying paths, as explained in greater detail below with reference to the exemplary embodiments.

The information concerning the product output of the at least one digital printing unit and at least one processing attribute of the product output may be provided by a process processing memory, in particular when the operating mode of the processing system to be implemented is known. Alternatively or additionally, for example a main product itself may bear such information, for example by means of an imprinted tag via which the appropriate information and/or processing attributes are delivered to the first control unit. A tag may be, for example, an identification number, a barcode, or a two-dimensional optical code, or otherwise an optically readable marker. It is also possible to attach an RFID tag. Alternatively or additionally, such information/processing attributes could also be fed, at least partially, from the second control unit to the first control unit.

One possible embodiment of a processing system according to the invention is characterized in that the at least one post-processing station includes a gathering device by means of which multiple one- or multilayer subproducts may be gathered to form a collection of adjoining subproducts. Subproducts may be, for example, printed products such as magazines, advertising leaflets, brochures, flyers, or printed sheets having identical or different dimensions and/or weights. Subproducts may also include product samples, CDs, and the like. Such stacks or collections may be inserted into main products as described below, for example.

Subproducts may also be book block intermediate products in the form of individual folded paper sheets or partial stacks of an overall book block, which may be gathered in the post-processing station to form a complete book block. In this case, the assembled book block forms the collection of adjoining subproducts. Such a book block may be the intermediate product of a book, catalog, or magazine, for example. The subproducts, as integral parts of the book block to be formed, may have been directly produced beforehand with a digital printer, or provided from a printed roll and fabricated, or produced using some other printing process, for example offset printing. Combinations of subproducts produced using different technologies are also possible.

One possible embodiment of a processing system according to the invention is characterized in that the at least one post-processing station includes an insertion device by means of which subproducts may be inserted into at least one main product of the product output.

Another possible embodiment of a processing system according to the invention is characterized in that the at least one post-processing station includes a binding device with which one or more subproducts may be bound to form a book block.

In such an embodiment of a processing system, the at least one post-processing station advantageously includes a device with which a bound book block may be milled and/or trimmed.

Another embodiment of a processing system according to the invention is characterized in that the processing system includes a detection device for detecting a certain main product or subproduct of the product output, and the second control unit for supplying a processing attribute, associated with this main product or subproduct, to the post-processing station is connected to the post-processing station.

One embodiment of a processing system according to the invention that is advantageous for certain applications is characterized in that the main products or subproducts of the product output of the digital printing unit bear an identifier that is applied in the digital printing unit, and the digital printing unit for supplying a processing attribute, associated with the identifier, to the first control unit is connected to the first control unit.

Such an identifier may be applied in particular by digital printing, or by means of a fast ink jet printer that operates at a distance, as used in the packaging industry, for example.

Good results may be achieved for certain operating modes when the detection device has an optical sensor for detecting a marker (for example, a barcode, a two-dimensional code, an identification number, or a postal address) that is applied to a main product or product or to the associated transport unit, and/or has an electromagnetic sensor for detecting an RFID tag that is applied to a main product or subproduct or to the associated transport unit.

A processing system that is particularly efficient to operate may be achieved when the coupling station includes a standby revolving conveyor having a plurality of independently conveyable transport units, as explained in greater detail below. The transport units are designed in such a way that they can efficiently transport the provided subproducts or products. The transport units may include clamps, for example, for holding one or more elements by clamping, or also suitable transport containers. It is also possible to provide various types of transport elements, which increases the flexibility with regard to products that can be processed.

A particularly high conveying capacity, and at the same time a high level of flexibility of the coupling station, may be achieved when the standby revolving conveyor has a circulating drive means (at least in areas), for example a chain, which carries the transport units along, at least in sections of the conveyor.

A processing system that is particularly efficient for certain types of production may be achieved when multiple products can be conveyed with at least individual transport units. These products may be subsequently post-processed together or also separately, depending on the requirements. In this way the transport volume may be increased, for example for a given number of transport units.

It may be provided that the transport units have identification means, preferably RFID tags and/or barcodes, that are readable by the first control unit before and/or during and/or after the transfer of a given main product of the product output, and that are linkable by the first control unit to association data via a unique identifier, and that may be associated with the main product by means of these association data, and that the first control unit for supplying the association data to the second control unit is connected to the second control unit.

It may be provided that the second control unit is connected to the post-processing station, preferably to an insertion device and/or a binding device and/or a trimming device, for detecting (reading in or reading out) identification means of the transport units, and for supplying processing attributes, associated with the main products that are conveyed by the transport units, to the post-processing station, preferably to the insertion device and/or the binding device and/or the trimming device, by means of the association data.

One embodiment of a processing system according to the invention is characterized in that the first control unit is part of a connected digital printing unit. A particularly economical processing system having a high level of flexibility may be produced in this way.

It may be provided that the second control unit for controlling at least one connected digital printing unit is connected to this digital printing unit. For example, reprinting of main products or subproducts is thus made possible, as explained in greater detail below. The control may include information exchange.

One embodiment of a processing system according to the invention is characterized in that the processing system includes a first input control for monitoring the product output of the at least one digital printing unit during the transfer to the coupling station, the first input control being connected to the second control unit for transmitting first monitoring data.

It may be provided that the second control unit is connected to the first input control and to the at least one post-processing station and/or to the at least one digital printing unit in such a way that the second control unit can use the first monitoring data for controlling the at least one post-processing station and/or the at least one digital printing unit. In this way, for example defective main products that are identified by the first input control may be processed separately in the post-processing station (for example, discharged from the processing system), and/or the at least one digital printing unit may be instructed to produce an appropriate replacement (reprint).

A particularly reliable processing system may be achieved when the processing system includes a second input control for monitoring the input of the at least one post-processing station, the second input control being connected to the second control unit for transmitting second monitoring data.

It may be provided that the second control unit is connected to the second input control and to the at least one digital printing unit in such a way that the second control unit can use the second monitoring data for controlling the at least one digital printing unit. In this way, main products that are damaged or misaligned during the preceding conveying operation, for example, may be recognized and processed separately (discharged, for example) in the post-processing station, and/or the at least one digital printing unit may be instructed to produce an appropriate replacement (reprint).

The processing system may thus also be configured in such a way that the digital printing unit can use the second monitoring data for post-production of main products.

One embodiment of a processing system according to the invention is characterized in that the processing system includes a checking device for the at least one post-processing station, the checking device being connected to the second control unit for transmitting third monitoring data.

According to one embodiment of such a processing system, the second control unit may use the third monitoring data for controlling the at least one digital printing unit and/or the coupling station. In this way, possible malfunctions (breakdowns, temporarily reduced capacities, for example) in the post-processing station may be detected by the second control unit and, for example, adapted to the product output of at least one digital printing unit, and/or main products may be rerouted into temporary storage, for example, until the malfunctions are eliminated. Adaptations of a product output may include in particular changes in the production speed and the type of main products produced by the digital printing unit.

It may be provided that a processing system according to the invention has at least one digital printing docking point for connecting a printed paper or film web, in particular a paper or film web that is printed by digital printing. Such a paper or film web may, for example, be unwound in an unwinding station, cut and/or crimped and/or stapled and/or glued in an intermediate processing station, and subsequently supplied to the post-processing station by means of the coupling station.

For certain applications, an intermediate processing station may also have a digital printing unit, in particular a digital print head. With such a digital printing unit, alternative or additional customization at least of portions of a printed paper or film web that is delivered by a directly connected digital printer or by a connected roll may be produced as needed.

For certain applications, an identifier may be applied, for example as an imprinted tag, to a paper or film web and/or to a main product or subproduct by means of such a digital printing unit.

According to another embodiment of such a processing system, for connecting a paper or film web, wound on a roll and printed by digital printing, the at least one digital printing docking point is connected to the second control unit for transmitting information concerning the paper or film web that is wound on the roll. For example, information concerning the contents or the type of paper or film web may thus be transmitted to the second control unit.

According to another embodiment of a processing system according to the invention, the second control unit is connected to the at least one digital printing docking point in such a way that the second control unit can use the first monitoring data (if present) and/or the second monitoring data (if present) and/or the third monitoring data (if present) for controlling the digital printing docking point in order to connect the main product or subproduct.

In one embodiment of a processing system according to the invention, the processing system includes one or more temporary stores for at least temporarily storing transport units with products, and/or transport units without products (empty transport units).

Such a temporary store may in particular be part of the at least one post-processing station and/or part of the at least one coupling station, or may be connected to the at least one post-processing station and/or the at least one coupling station.

In particular, unused empty transport units may be temporarily stored in such a temporary store, thus adapting the conveying system to the production requirements of the processing system, so that its efficiency may be increased.

Particularly efficient utilization of such temporary stores may be achieved in particular by using independently conveyable transport units that can convey customized products, as discussed in greater detail below.

The temporary stores may have a first in, first out (FIFO) architecture.

It is also possible to collect and temporarily store products in such temporary stores, for example as a function of certain processing attributes. (Pre)sorting of products may also be achieved in this way.

A temporary store as described here also allows in particular the utilization capacity of a digital printer connected to the processing system to be optimized.

A very versatile, efficient processing system may be achieved in particular by using multiple temporary stores arranged in series and/or in parallel with respect to one another.

By means of temporary stores, products may also be temporarily stored, for example in the event of temporary malfunctions in the post-processing facility, so that, for example, a complete shutdown of the processing system may be prevented.

Such temporary stores may in particular have a spiral design, as the result of which particularly space-saving temporary stores may be created, as described in greater detail below.

A temporary store may include a detection device for detecting a certain product, and the second control unit for supplying a processing attribute, associated with this product, to the temporary store may be connected to the temporary store. The temporary storage of certain products may thus be controlled in a particularly efficient manner, and the flexibility of the facility may be increased.

Good results for certain operating modes may be achieved when the detection device has an optical sensor for detecting a marker (a barcode or a postal address, for example) that is applied to a product or to the associated transport unit, and/or has an electromagnetic sensor for detecting an RFID tag that is applied to a product or to the associated transport unit.

Temporary stores as described above may also be regarded as a separate concept according to the invention, independently of a processing system according to the invention.

In one embodiment of a processing system according to the present invention, the processing system includes at least one sorting device. Such a sorting device may in particular be part of the at least one post-processing station and/or part of the at least one coupling station.

By means of a sorting device, in particular the sequence of multiple products conveyed by transport units may be changed, in particular as a function of at least one processing attribute that is associated with the products transported by the transport unit.

A sorting device may include a detection device for detecting a certain product, and the second control unit for supplying a processing attribute, associated with this product, to the sorting device may be connected to the sorting device. In this way the sorting of certain products may be controlled in a particularly efficient manner, and the flexibility and overall efficiency of the facility may be increased.

Good results for certain operating modes may be achieved when the detection device has an optical sensor for detecting a marker (a barcode or a postal address, for example) that is applied to a product or to the associated transport unit, and/or has an electromagnetic sensor for detecting an RFID tag that is applied to a product or to the associated transport unit.

A sorting device as described above may also be regarded as a separate concept according to the invention, independently of a processing system according to the invention.

Another embodiment of a processing system according to the invention is characterized in that the at least one digital printing unit is a digital printer or an unwinding station for a paper or film web, wound on a roll, that is printed by digital printing.

In such an embodiment of a processing system, the at least one digital printing unit advantageously includes a device for folding paper sheets that are printed with the digital printer, or a device for folding the paper or film web, unwound from the roll, that is printed by digital printing.

Additionally or alternatively, in such an embodiment of a processing system the at least one digital printing unit includes a device for separating individual paper sheets from the unwound, folded or unfolded paper or film web.

Additionally or alternatively, in such an embodiment of a processing system the at least one digital printing unit includes a device for stacking folded or unfolded paper sheets.

In the embodiments of a processing system mentioned above, the at least one digital printing unit particularly advantageously includes a device for temporarily or permanently adhesively bonding folded or unfolded paper sheets. Such adhesive bonding may be carried out, for example, during a stacking operation, or on a finished stack.

Depending on the batch size and the required flexibility, by use of the above-mentioned processing systems, book block intermediate products may be directly produced with the digital printer, or by means of the provided rolled-up paper or film web that is printed by digital printing.

It is likewise possible to analogously provide or print book bindings and/or dust jackets, and to deliver these to processing systems, so that a book made up of a book block and a binding, for example, may be subsequently finished in a post-processing station.

It is also conceivable within the scope of the invention for the processing system to have a third control unit for controlling the coupling station, as described in greater detail below.

A third control unit may also be used in particular for controlling a temporary store or a temporary store system comprising multiple temporary stores, and/or a sorting device.

In particular, a third control unit may thus be used for sorting the main products and subproducts in order to optimize the utilization capacity of at least one post-processing station. Efficient operation of the processing system may thus be achieved for a plurality of operating modes.

In certain embodiments of a processing system according to the invention, the first control unit and/or second control unit and/or third control unit (if present) may be situated on a multiprocessor board.

By using a digital printing unit, in particular at least one digital printer, according to one embodiment of a processing system according to the invention the product output may be controlled in such a way that the main products (and optionally subproducts) produced by same may already be fed into the coupling station in a sequence that is advantageous for the efficient operation of the post-processing station. Thus, the intermediate products (and/or main products) may be produced, or delivered to the coupling station, for example in a sequence that is sorted according to certain processing attributes or other criteria (for example, according to postal addresses of the end users of the particular products, or the correct sequence of subblocks of a book block), or at least a sequence that is advantageous for a separate sorting process in a sorting device.

In another advantageous variant of a processing system according to the invention, a post-processing station includes one or more devices for follow-up processing, in particular for packaging finished products. For example, finished products such as books or catalogs may be film-wrapped using such a device. Using another appropriate device, finished products may be wrapped in cardboard or packaged in some other way in order to obtain a packaged product that is ready for shipping. In addition, an addressing device may also be provided.

The post-processed products may subsequently be removed from the processing system for further use (shipment, storage, for example), or they may be transferred back to the processing system, for example for temporary storage in a temporary store, or they may be delivered to a downstream intralogistic system.

BRIEF DESCRIPTION OF SEVERAL VIEWS OF THE DRAWINGS

The invention is explained in greater detail below with reference to exemplary embodiments in conjunction with the drawings.

DETAILED DESCRIPTION OF THE INVENTION

Figure 1:
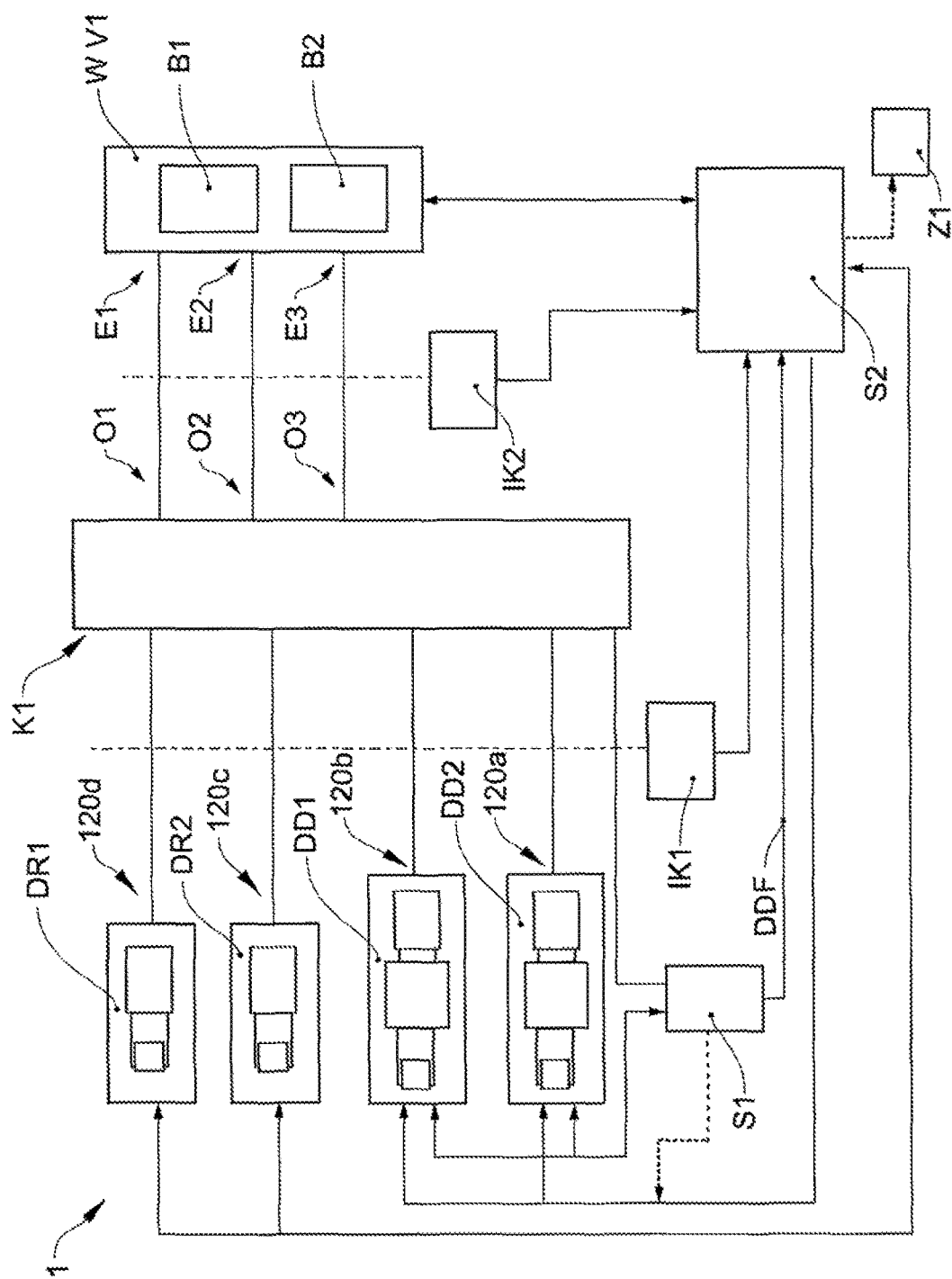
FIG. 1 schematically shows a first embodiment of a processing system according to the invention.

In the following figures and the associated description, corresponding parts are provided with the same reference numerals unless noted otherwise. The specific exemplary embodiments described in each case stand for the subject matter of the invention by way of example, and have no limiting character.

FIG. 1 shows one embodiment of a processing system 1, comprising digital printing units DD1, DD2, DR1, and DR2, a coupling station K1, a post-processing station WV1, a first control unit S1, a second control unit S2, a first input control IK1, and a second input control IK2.

The digital printing units DD1 and DD2 are designed as digital printers that are connected to the coupling station K1 via digital printing docking points 120a, b.

The digital printing units DR1 and DR2 are designed as unwinding stations for rolls (paper or film webs, for example) printed by digital printing, and are connected to the coupling station K1 via digital printing docking points 120c, d.

The coupling station K1 is connected to inputs E1, E2, E3 of the post-processing station WV1 by means of output lines O1, O2, and O3. The digital printing units DD1, DD2, DR1, and DR2 are thus connected via the coupling station K1 to the post-processing station WV1, which in the embodiment shown has two processing stations B1, B2.

The digital printing units DD1, DD2, DR1, and DR2 produce main products HP1, . . . , HPn and/or subproducts, which are delivered to the coupling station K1 via the digital printing docking points 120a-d. The first control unit S1 is situated at the digital printing units DD1, DD2, DR1, DR2. For a product output of a main product HP1, for example, the first control unit S1 receives a processing attribute VA1 with information about the post-processing of the main product HP1.

The input control IK1 is situated in front of the coupling station K1, and monitors the product output during the transfer to the coupling station K1 and delivers first monitoring data to the second control unit S2. The control unit S1 delivers information about the product output, in particular the processing attributes VA1, . . . , VAn, to the second control unit S2 by means of a dynamic data feed DDF.

First monitoring data of the input control IK1 may likewise be delivered to the second control unit S2.

The second input control IK2 is situated in front of the post-processing station WV1, and monitors the input E1, E2, E3 of the post-processing station. WV1 into which the output lines O1, O2, O3 coming from the coupling station K1 open.

Second monitoring data of the second input control IK2 may be delivered to the second control unit S2, for example to monitor achievement of a predefined target state of the main products HP1, . . . , HPn accepted by the coupling station K1.

The second control unit S2 controls the post-processing station WV1 in accordance with the information it has received from the first control unit S1. For example, the second control unit S2 may initiate and control post-processing of a main product HP1 in the post-processing station WV1 according to the processing attribute VA1.

The second control unit S2, as shown, may be connected back to the digital printing units DD1 and DD2, so that the second control unit S2 may temporarily change or adapt the product output by actuating the digital printing units DD1 and DD2, depending on information from the first and/or second monitoring data. This may be necessary, for example, in the event that a limited reprint is required if the main products are determined to be missing or defective by the input controls IK1 and/or IK2. In particular, for example the second input control IK2 may recognize damaged or misaligned main products HP1, . . . , HPn during the preceding conveying operation, and the second control S2 may initiate discharging of the products in question as necessary, and may initiate a reprint of the product in question as appropriate.

As an alternative or in addition to such a reprint by the processing system 1 itself, for example, the second control S2 may deliver appropriate data to a second processing system Z1 (optionally separate from the processing system 1), which produces an appropriate reprint and delivers it separately.

It is also conceivable for such a second processing system Z1 to include an online interface, and for example to provide missing parts of an end product to the end user online, for example by requesting via the World Wide Web.

The second control unit S2 is also connected back to the digital printing units DR1, DR2, and may actuate same if necessary, for example by start/stop commands or commands for varying the unrolling speed.

The second control unit S2 may likewise receive from the digital printing units DR1 and DR2 information concerning, for example, the content of the digital printing products contained therein, and optionally use same for controlling the post-processing station WV1 and/or at least one digital printing unit DD1, DD2, DR1, DR2.

Figure 2:
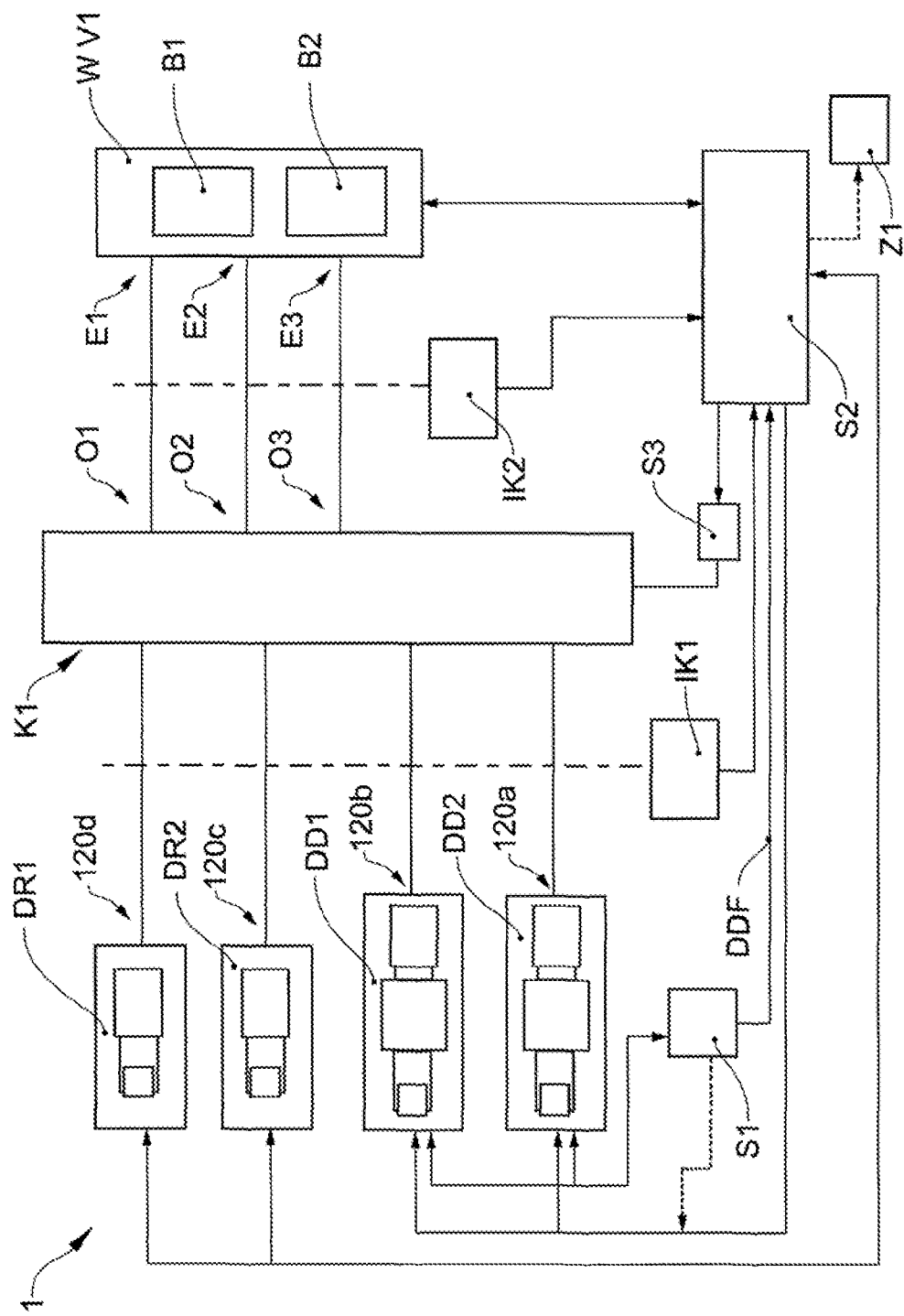
FIG. 2 schematically shows a second embodiment of a processing system according to the invention.

FIG. 2 shows one refinement of the embodiment of a processing system 1 shown in FIG. 1, having a third control unit S3 for controlling the coupling unit K1. The third control unit S3, as shown, may use information it receives from the second control unit S2, which may optionally also be based on information that the second control unit S2 has received from the first control unit.

In another refinement of such an embodiment, the third control unit S3 may also obtain information directly from the first control unit S1 and use it for controlling the coupling unit K1.

Figure 3:
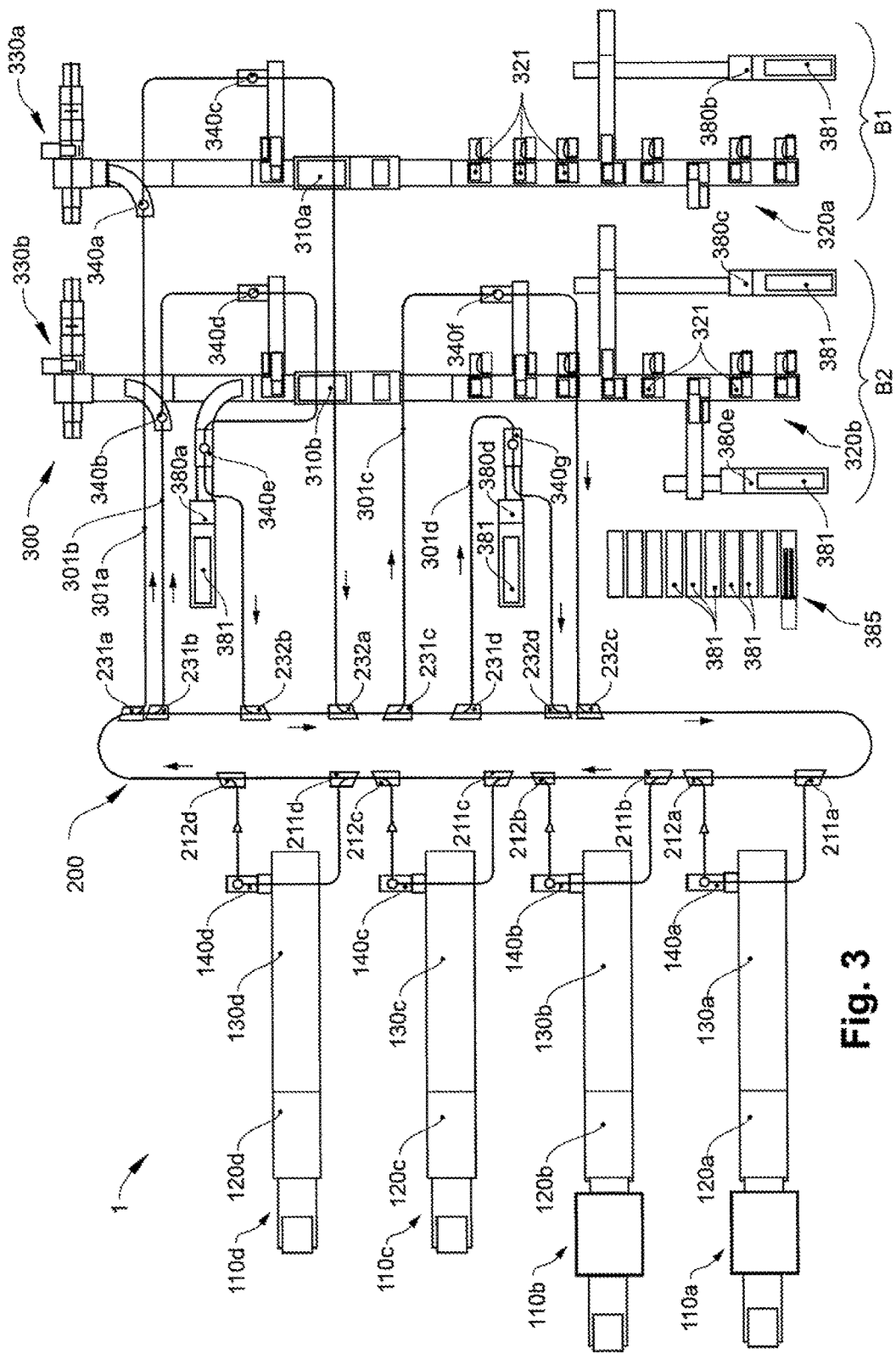
FIG. 3 schematically shows a third embodiment of a processing system according to the invention.

FIG. 3 shows another embodiment of a processing system 1 having digital printing units 110*a-d*, designed as digital printers 110*a*, 110*b*, and unwinding stations for rolls 110*c*, 110*d* that are printed by digital printing, the digital printing units being connected to a coupling station 200 via digital printing docking points 120*a-d*. Situated adjacent to the digital printers 110*a*, 110*b* or the unwinding stations 110*c*, 110*d* for rolls printed by digital printing are intermediate processing stations 130*a-d*, in which the digitally printed products (not illustrated in detail) may be intermediately processed, for example by suitable cutting and/or crimping and/or folding and/or stapling and/or gluing and/or printing by means of a digital printing unit, and/or stacking with or without temporary adhesive bonding. Situated adjacent to the intermediate processing stations 130*a-d* are transfer points 140*a-d*, in which the main products HP1, . . . , HPn (not shown in detail) that are digitally printed and optionally intermediately processed by means of the intermediate processing stations 130*a-d* may be received by transport units (not shown in detail).

A first control unit S1 (not illustrated in detail) is connected to the digital printers 110*a*, 110*b* and the unwinding stations 110*c*, 110*d* for rolls printed by digital printing, as well as to the coupling station 200, and records the digitally printed main products HP1, . . . , HPn by storing the processing attributes VA1, . . . , VAn associated with the main products HP1, . . . HPn. The transport units are discharged from the coupling station 200 via discharge gates 211*a-d* and fed to the transfer points 140*a-d*, where they receive the products.

After receiving the main products HP1, . . . , HPn, the transport units are fed into the coupling station 200 via feed switches 212*a-d*. In the embodiment shown, the coupling station 200 is designed as a standby revolving conveyor on which the transport units are independently conveyable. One possible embodiment of such transport units is described in greater detail below with reference to FIG. 6. In the shown embodiment of a processing system according to the invention, each digital printer 110*a-d* is connected to the coupling station 200 via a transfer point 140*a-d*, a discharge gate 211*a-d*, and a feed switch 212*a-d*.

The coupling station 200 is connected via discharge gates 231*a-d* and feed switches 232*a-d* to output lines 301*a-d*, which lead to the post-processing station 300.

In FIG. 3, the post-processing station 300 includes two processing stations B1, B2 that are designed as main post-processing lines and that have insertion devices 310*a, b*, upstream from which a gathering device 320*a, b*, respectively, is situated.

In addition, the shown embodiment of a post-processing station 300 includes two stacking devices 330*a, b*, each of which is connected to one of the processing lines and is connected to an output line 301*a, b* via a transfer point 340*a, b*, respectively.

The insertion devices 310*a, b* are connected to a second control unit S2 (not illustrated), from which they receive processing attributes VA1, . . . , VAn, associated with the main products HP1, . . . , HPn, according to which, for example, subproducts may be inserted into the main products HP1, . . . , HPn.

The second control unit S2 is connected to the first control unit S1, and receives transmissions of the processing attributes VA1, . . . , VAn from same. The transport units in the embodiment shown are provided with barcodes (not shown) that allow identification of the particular transport units. When the main products HP1, . . . , HPn on the transport units are received at the transfer points 140*a-d*, the first control unit S1 detects the barcode and associates the particular transport unit with the main product accommodated by this transport unit, using association data. These association data are transmitted to the second control unit S2.

By means of the association data and barcode readers that are present in the post-processing station 300, for example for the insertion devices 310*a, b*, the second control unit S2 may retrieve the particular required processing attribute and send it to the insertion device 310*a, b*.

In the embodiment shown, situated in each case adjacent to the insertion devices 310*a, b* are stacking devices 330*a-b* in which the main products together with the inserted subproducts TP1, . . . , TPn, for example, may be stacked.

After a main product, conveyed via a transport unit, is discharged from the coupling station 200 by the corresponding discharge gate 231*a* and further conveyed to the associated output line 301*a*, it may be delivered by the transport unit via the corresponding transfer point 340*a* and led directly to the corresponding stacking device 330*a*.

Alternatively, a main product on the output line 301*a* may be further conveyed and delivered by the transport unit to a subsequent transfer point 340*c* and supplied to a first insertion device 310*a*.

In the first insertion device 310*a*, for example a subproduct that is designed as a stack or collection and produced in the gathering device 320*a* (picking facility) may be inserted into the main product.

In the embodiment shown, the gathering device 320*a* includes multiple feeding devices 321 (for better clarity, not all feeding devices are provided with reference numerals) by means of which subproducts, for example insert sheets, may be fed, optionally as a function of the processing attributes VA1, . . . , VAn for gathering a stack or a collection. It is also possible to unwind subproducts from a wound roll 381 by means of a winding station 380b. Such wound rolls 381 may, for example, have been produced beforehand with the same processing system 1 or with some other facility, such as an offset printing facility (not illustrated).

For this purpose, the processing system 1 includes a winding station 380d that is connected to the coupling station 200 by means of an output line 301d and a transfer point 340g. For example, main products or subproducts may be wound on a wound roll 381 in this winding station 380d for intermediate storage or transport. Such a wound roll 381 may be temporarily stored in a wound roll store 385 before the products wound thereon are added to a gathering device 320a, b, for example, as subproducts.

Alternatively or additionally, such a winding station 380d may be used for unwinding wound rolls, wherein the unwound main products or subproducts in the transfer point 340g may be accommodated by transport units and subsequently fed to the coupling station 200.

The end products produced by means of the gathering devices 320a and the insertion device 310a may subsequently be supplied to the stacking device 330a and stacked and/or packetized there.

As likewise schematically illustrated in FIG. 3, the second processing station B2 shown has a similar design to the first processing station B1. Subproducts of two winding stations 380c, e may be fed into the gathering device 320b in the second processing station B2. It is likewise possible to feed subproducts, previously coming from an unwinding station for rolls 110c, d printed by digital printing and supplied via a corresponding output line 301c and delivered to a transfer point 340f, into the gathering device 320b.

As schematically illustrated, after the subproducts that are gathered and ultimately inserted into a main product, for example, pass through the insertion device 310b, they may be supplied either to the associated stacking device 330b or to the associated winding station 380a.

For example, the facilities offered by the applicant under the name "MiniSert" may be used as insertion devices 310a, b.

Empty transport units, which have delivered the main products (or optionally subproducts) to the insertion devices 310a, b or the winding stations 380a, d, are returned via return lines 302a-d to the coupling station 200, where they are fed via feed switches 232a-d.

Figure 4:
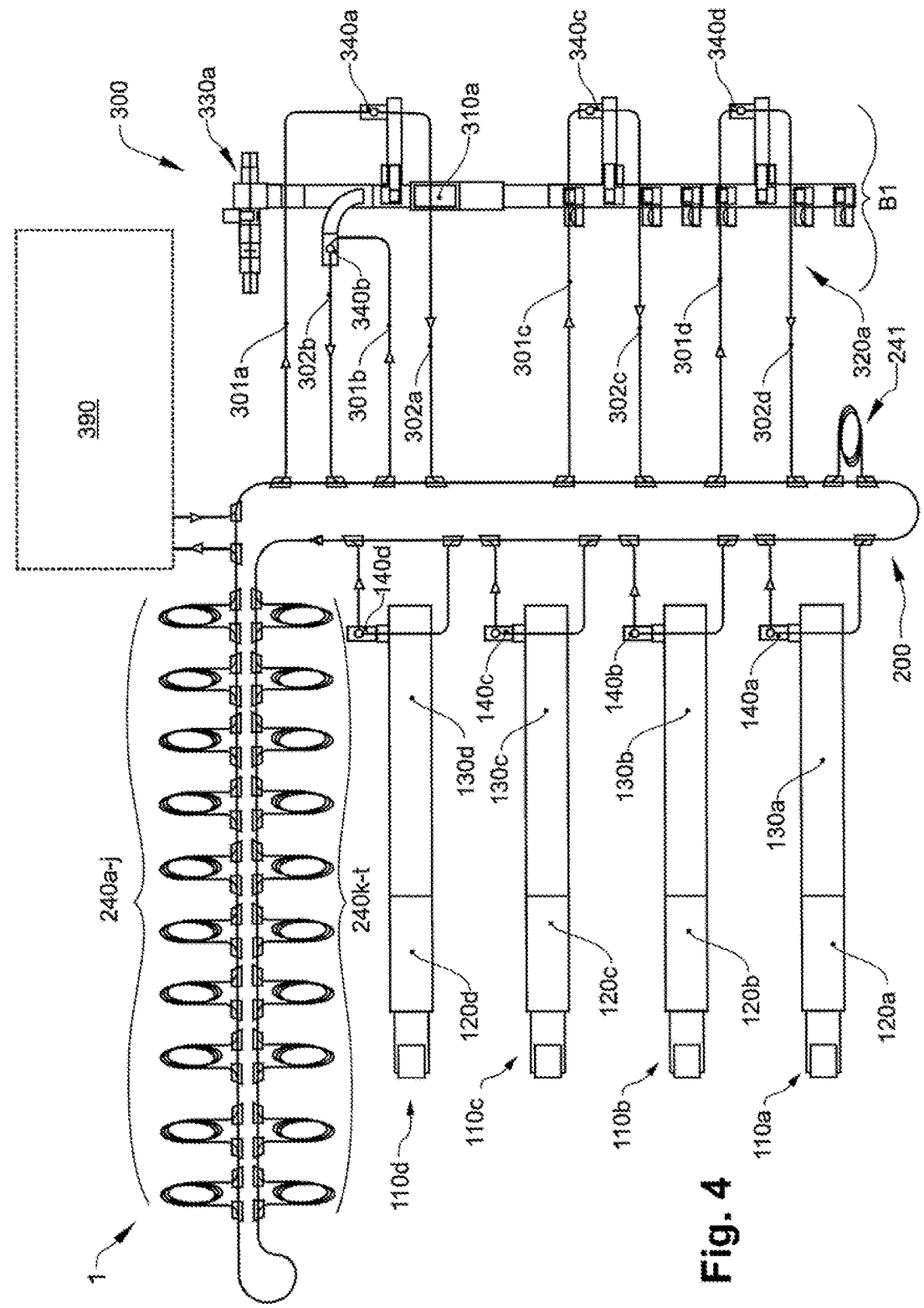
FIG. 4 schematically shows a fourth embodiment of a processing system according to the invention.

FIG. 4 schematically shows another embodiment of a processing system 1 according to the invention, having four digital printing docking points 120a-d to which four digital printing units 110a-d are connected, and which are connected to a post-processing station 300 via a coupling station 200.

A first control unit S1 (not illustrated in detail) is connected to the digital printing units 110a-d and to the coupling station 200, and records the digitally printed main products HP1, . . . , HPn by storing processing attributes VA1, . . . , VAn associated with the main products HP1, . . . , HPn.

The post-processing station 300 includes a processing station B1 having a gathering device 320a with multiple feeding devices, wherein two of the feeding devices may be supplied with main products via associated output lines 301c, d, respectively.

The processing station B1 also includes an insertion device 310a, which may be supplied with main products or subproducts via an associated output line 301a.

Adjacent to the insertion device 310a, the processed main products or subproducts may optionally be supplied to the coupling station 200, either by means of a transfer station 340b and an associated return line 302b, or directly further conveyed to a stacking device 330a (as end products, for example).

The post-processing station 300 is connected to a second control unit S2 (not illustrated), from which it receives processing attributes VA1, . . . , VAn associated with the main products HP1, . . . , HPn and according to which, for example, individual subproducts in the gathering device 320a may be assembled and inserted into the main products HP1, . . . , HPn in the insertion device 310a.

The second control unit S2 is connected to the first control unit S1, from which it receives transmissions of the processing attributes VA1, . . . , VAn.

A temporary store 241 for empty transport units, which has a space-saving spiral geometry, is associated with the coupling station 200 shown. Since this temporary store is intended only for empty transport units, i.e., providing space for products carried by the transport units is not necessary, the store may have a particularly compact design.

Likewise associated with the coupling station 200 are multiple temporary stores 240a-t for main products HP1, . . . , HPn or subproducts, in which transport units carrying products, and/or empty transport units, may be temporarily stored.

It is likewise possible to temporarily store empty transport units in these temporary stores, together with or instead of products. Particularly efficient operation of the processing system 200 may thus be achieved for various types of production.

The temporary stores 240a-t illustrated in FIG. 4 have a spiral design, and have a first in, first out (FIFO) architecture.

The processing system 1 shown also includes a sorting device 390, which likewise is associated with the coupling station 200 and which may be directly or indirectly controlled by the second control S2.

The sequence of multiple main products HP1, . . . , HPn conveyed by transport units may be changed by means of the sorting device 390, in particular as a function of at least one processing attribute VA1, . . . , VAn associated with the main product HP1, . . . , HPn that is transported by the transport unit.

Alternatively or additionally, the transport units may be at least presorted by means of the temporary stores 240a-t, i.e., placed in an arrangement (a sequence, for example) that increases the efficiency of the actual sorting device 390, before they are supplied to the sorting device 390.

Figure 5:
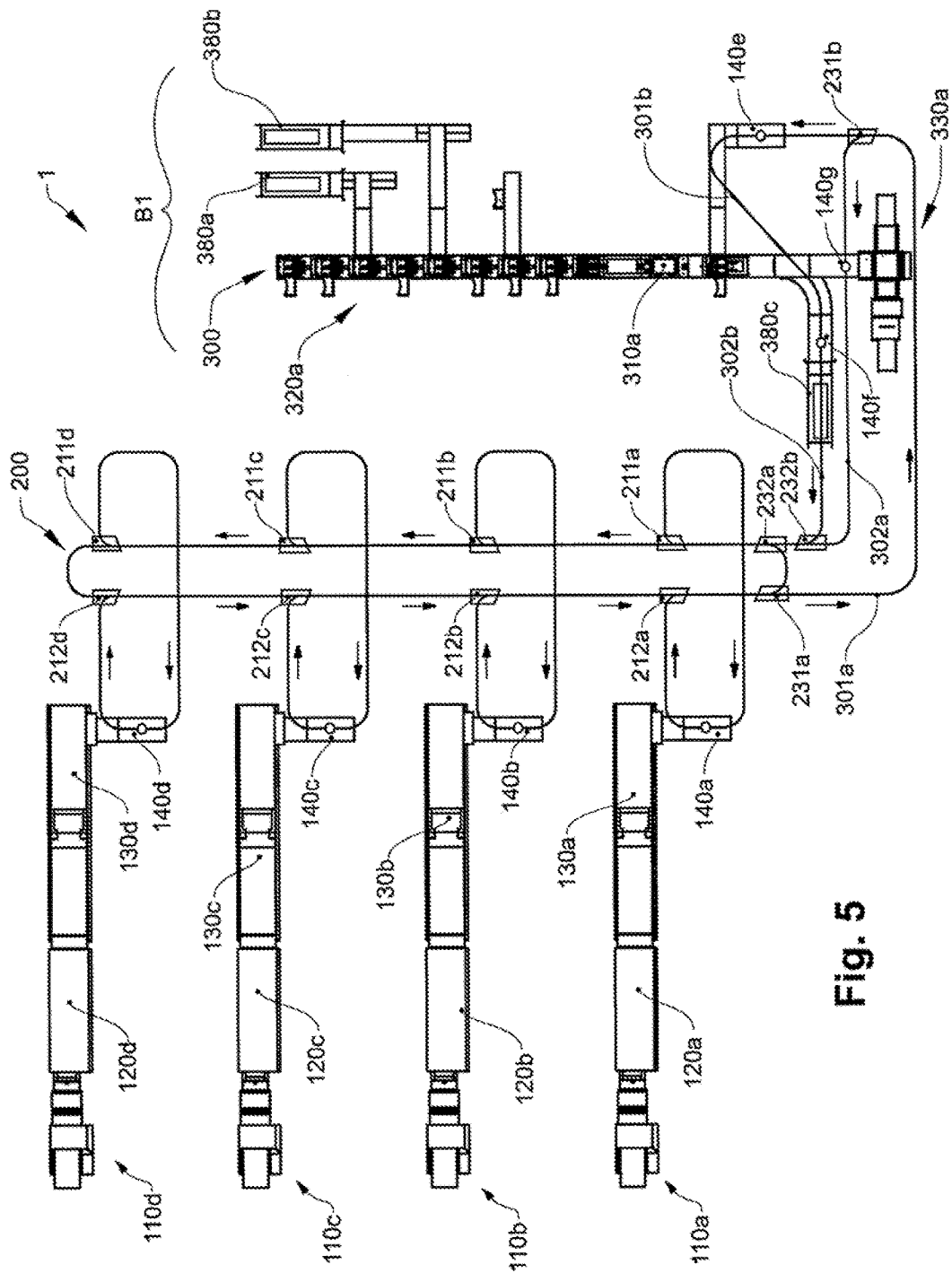
FIG. 5 schematically shows a fifth embodiment of a processing system according to the invention.

FIG. 5 schematically shows another embodiment of a processing system 1 according to the invention, having four digital printing docking points 120a-d at which digital printing units 110a-d, each including digital printers in the illustrated embodiment, are docked.

Alternatively, an unwinding station, for example for a roll that is printed by digital printing, may also be docked at at least one digital printing docking point 120a-d. Situated adjacent to the digital printing units 110a-d are intermediate processing stations 130a-d in which the digitally printed products may be intermediately processed, for example by suitable cutting and/or crimping and/or stapling and/or gluing.

Situated adjacent to the intermediate processing stations 130a-d are transfer points 140a-d in which the main products HP1, . . . , HPn (not shown in detail), which are digitally printed and optionally intermediately processed by means of the intermediate processing stations 130a-d, may be received by transport units (not shown in detail).

The transport units are discharged from a coupling station 200 via discharge gates 211a-d and fed to the transfer points 140a-d. A first control unit S1 (not illustrated in detail) is connected to the digital printing units 110a-d and to the coupling station 200, and records the digitally printed main products HP1, . . . , HPn by storing processing attributes VA1, . . . , VAn associated with the main products HP1, . . . , HPn.

After receiving the main products HP1, . . . , HPn, the transport units are fed into the coupling station 200 by feed switches 212a-d. In the embodiment shown, the coupling station 200 is designed as a standby revolving conveyor on which the transport units are independently conveyable.

The processing system 1 also includes a post-processing station 300 having a processing station B1 with a gathering device 320a, an insertion device 310a, and a stacking device 330a that are connected to a second control unit S2 (not illustrated). From the second control unit they receive processing attributes VA1, . . . , VAn associated with the main products HP1, . . . , HPn, according to which, for example, subproducts may be inserted into the main products HP1, . . . , HPn.

The second control unit S2 is connected to the first control unit S1, and receives from same transmissions of the processing attributes VA1, . . . , VAn.

A first output line 301a is connected to the coupling station 200 by means of a discharge gate 231a, and if desired, the main products conveyed by the transport units may be delivered to the stacking device 330a at the first transfer point 140g.

Alternatively, transport units may be conveyed from the first output line 301a to a second output line 301b by means of a further discharge gate 231b, and as a function of a processing attribute VA1, . . . , VAn associated with the conveyed main product HP1, . . . , HPn, either delivered to the insertion device 310a at a second transfer point 140e, where, for example, a subproduct produced in the gathering device 320a is inserted therein, or delivered to a winding station 380c at a third transfer point 140f, where the main products HP1, . . . , HPn may be wound.

The transport units may subsequently be returned to the coupling station 200 via the return lines 302a, b and feed switches 232a, b.

Figure 6:
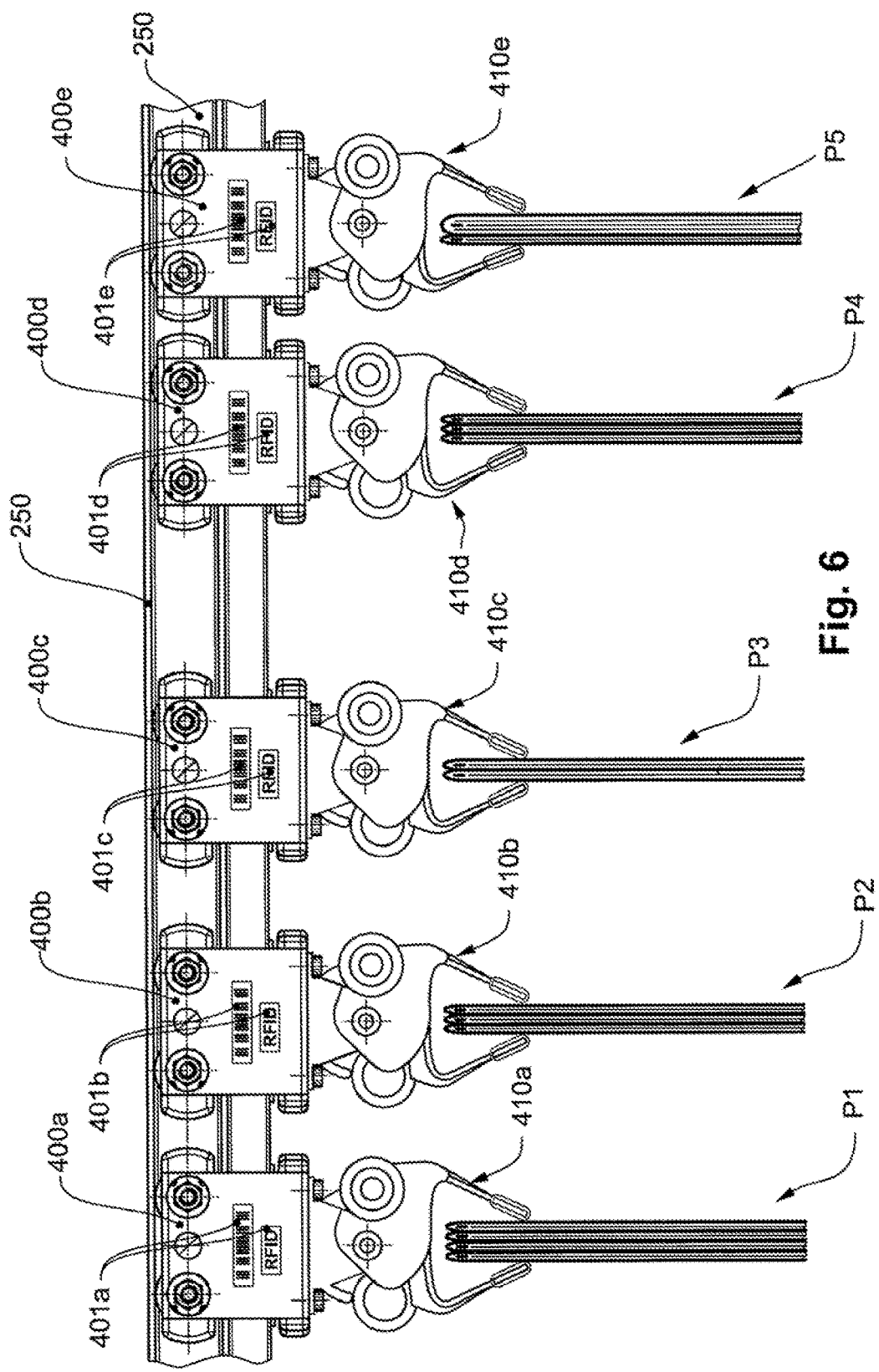
FIG. 6 schematically shows first embodiments of transport units for a processing system according to the invention.

FIG. 6 schematically shows multiple transport units 400a-e designed as carriages, each having identification means 401a-e which in the embodiment shown include a barcode as well as an RFID tag. Such transport units 400a-e have been disclosed, for example, in WO 2016/030275 A1 by the applicant.

The transport units 400a-e engage with a track 250 along which they are independently conveyable. The transport units 400a-e have a holding means 410a-e, respectively, designed as a clamp, in which in each case a product P1-P5 made up of one or more subproducts is held in the case shown.

It is also possible for multiple individual products as described above to be conveyed together, at least temporarily, by a transport unit by use of holding means, and subsequently separated, at least temporarily.

As schematically illustrated, the main products HP1-HP5 may have different designs, for example adapted to the individual requirements of an end user. Such requirements may depend, for example, on personal interests, place of residence, gender, and the exact time that the main product was produced.

By using transport units 400a-e in the illustrated embodiment, particularly reliable transport, even of very different products P1-P5, may be achieved.

The scope of the present invention is not limited to the specific embodiments described herein. Rather, the description and the associated figures, in addition to the examples disclosed herein, result in various further modifications of the present invention for those skilled in the art, which likewise are encompassed by the protective scope of the claims. Furthermore, various references are cited in the description, the disclosed content of which is hereby fully incorporated by reference into the description.

It is claimed:

1. A processing system having at least one digital printing docking point for connecting at least one digital printing unit and at least one post-processing station connected by a coupling station so that at least one input of the at least one post-processing station is connected to at least one digital printing docking point (120a-d), the processing system comprising:
    a first control unit for controlling the coupling station;
    a second control unit for controlling the at least one post-processing station, wherein the first control unit is supplied with information concerning the product output of the at least one digital printing unit and at least one processing attribute of the product output, and directly or indirectly transfers the information to the second control unit through a dynamic data feed, and the at least one post-processing station is controlled by the second control unit by this information; and
    wherein the coupling station includes a standby revolving conveyor having a plurality of independently conveyable transport units.

2. The processing system according to claim 1, wherein the at least one post-processing station includes a gathering device by which multiple one- or multilayer subproducts may be gathered to form a collection of adjoining subproducts.

3. The processing system according to claim 1, wherein the at least one post-processing station includes an insertion device by which subproducts may he inserted into at least one main product of the product output.

4. The processing system according to claim 1, wherein the at least one post-processing station includes a binding device with which one or more subproducts may be bound to form a book block.

5. The processing system according to claim 4, wherein the at least one post-processing station includes a device with which a bound book block may he milled and/ or trimmed.

6. The processing system according to claim 1, wherein the processing system includes a detection device for detecting a certain main product or subproduct of the product output, and the second control unit, for supplying a processing attribute associated with this main product or subproduct to the post-processing station, is connected to the post-processing station.

7. The processing system according to claim 6, wherein the main products or subproducts of the product output of the digital printing unit bear an identifier that is applied in the digital printing unit, and the digital printing unit, for supplying a processing attribute associated with the identifier, to the first control unit, is connected to the first control unit.

8. The processing system according to claim 1, wherein the coupling station is connected to at least one temporary store in which transport units carrying products, and/or empty transport units, may be at least temporarily stored.

9. The processing system according to claim 1, wherein the transport units include identification means, preferably RFID tags and/or barcodes, that are readable by the first control unit before and/or during and/or after the transfer of a given main product of the product output, and that are linkable by the first control unit to association data via a unique identifier, and that may be associated with the main product by means of these association data, and the first control unit for supplying the association data to the second control unit is connected to the second control unit.

10. The processing system according to claim 1, wherein the second control unit is connected to the post-processing station, preferably to an insertion device and/or a binding device and/or a trimming device, for detecting the identification means of the transport units, and for supplying processing attributes, associated with the main products that are conveyed by the transport units, to the post-processing station, to the insertion device and/or the binding device and/or the trimming device, by means of the association data.

11. The processing system according to claim 1, wherein the first control unit is part of a connected digital printing unit.

12. The processing system according to claim 1, wherein the second control unit for controlling at least one connected digital printing unit is connected to the digital printing unit.

13. The processing system according to claim 1, wherein the processing system includes a first input control for monitoring the product output of the at least one digital printing unit during the transfer to the coupling station, the first input control being connected to the second control unit for transmitting first monitoring data.

14. The processing system according to claim 13, wherein the second control unit is connected to the first input control and to the at least one post-processing station and/or to the at least one digital printing unit (DD1,DD2, DR1, DR2, 110a-d) in such a way that the second control unit can use the first monitoring data for controlling the at least one post-processing station and/or the at least one digital printing unit.

15. The processing system according to claim 1, wherein the processing system includes a second input control for monitoring the input of the at least one post-processing station, the second input control being connected to the second control unit for transmitting second monitoring data.

16. The processing system according to claim 15, wherein the second control unit is connected to the second input control and to the at least one digital printing unit in such a way that the second control unit can use the second monitoring data for controlling the at least one digital printing unit.

17. The processing system according to claim 16, wherein the digital printing unit is configured so that the digital printing unit can use the second monitoring data for post-production of main products.

18. The processing system according to claim 1, wherein the processing system includes a checking device for the at least one post-processing station, the checking device being connected to the second control unit for transmitting third monitoring data.

19. The processing system according to claim 16, wherein the second control unit uses the third monitoring data for controlling the at least one digital printing unit and/or the coupling station.

20. The processing system according to claim 1, further comprising at least one digital printing docking point for connecting a printed paper or film web wound on a roll, in particular a paper or film web that is printed by digital printing.

21. The processing system according to claim 20, wherein, for connecting the printed paper or film web that is wound on a roll, the at least one digital printing docking point is connected to the second control unit for transmitting information concerning the paper or film web that is wound on the roll.

22. The processing system according to claim 20, wherein the second control unit is connected to the at least one digital printing docking point so that the second control unit can use the first monitoring data and/or the second monitoring data and/or the third monitoring data for controlling the digital printing docking point for connecting the paper or film web that is wound on a roll and printed in particular by digital printing.

23. The processing system according to claim 1, wherein the at least one digital printing unit comprises a digital printer or an unwinding station for a paper or film web that is wound on a roll and printed by digital printing.

24. The processing system according to claim 23, wherein the at least one digital printing unit includes a device for folding paper sheets that are printed with the digital printer, or a device for folding the paper or film web, unwound from the roll, that is printed by digital printing.

25. The processing system according to claim 23, wherein the at least one digital printing unit includes a device for separating individual paper sheets from the wound, folded or unfolded paper or film web.

26. The processing system according to claim 23, wherein the at least one digital printing unit includes a device for stacking folded or unfolded paper sheets.

27. The processing system according to claim 23, wherein the at least one digital printing unit includes a device for temporarily or permanently adhesively bonding folded or unfolded paper sheets.

28. The processing system according to claim 1, wherein the processing system includes a third control unit for controlling the coupling station.

* * * * *